(12) United States Patent
Marsch et al.

(10) Patent No.: US 9,893,933 B2
(45) Date of Patent: Feb. 13, 2018

(54) CONFIGURATION OF CHANNEL ESTIMATION RELATED PARAMETERS

(71) Applicant: Nokia Solutions and Networks Management International GmbH, Munich (DE)

(72) Inventors: Patrick Marsch, Wroclaw (PL); Frank Frederiksen, Klarup (DK); Wolfgang Zirwas, Munich (DE)

(73) Assignee: Nokia Solutions and Networks Management International GmbH, Munich (DE)

( * ) Notice: Subject to any disclaimer, the term of this patent is extended or adjusted under 35 U.S.C. 154(b) by 46 days.

(21) Appl. No.: 15/023,724

(22) PCT Filed: Sep. 25, 2013

(86) PCT No.: PCT/EP2013/069961
§ 371 (c)(1),
(2) Date: Mar. 22, 2016

(87) PCT Pub. No.: WO2015/043628
PCT Pub. Date: Apr. 2, 2015

(65) Prior Publication Data
US 2016/0234063 A1    Aug. 11, 2016

(51) Int. Cl.
*H04L 12/24* (2006.01)
*H04L 1/00* (2006.01)
*H04L 5/00* (2006.01)
*H04L 27/26* (2006.01)

(52) U.S. Cl.
CPC .......... *H04L 41/0803* (2013.01); *H04L 1/003* (2013.01); *H04L 1/0026* (2013.01); *H04L 5/0007* (2013.01); *H04L 5/0048* (2013.01); *H04L 27/261* (2013.01)

(58) Field of Classification Search
CPC ........ G01S 19/09; G01S 19/46; G01S 5/0263; G06F 21/6218; G06F 2211/009
See application file for complete search history.

(56) References Cited

U.S. PATENT DOCUMENTS 8,873,654 B2 * 10/2014 Golovins ............. H04B 17/005
                                                     375/260
2009/0296839 A1    12/2009 Stadelmeier et al.

FOREIGN PATENT DOCUMENTS

CN    103117966 A    5/2013
WO    2011/070427 A1    6/2011

OTHER PUBLICATIONS

International Search Report and Written Opinion received for corresponding Patent Cooperation Treaty Application No. PCT/EP2013/069961, dated Aug. 25, 2014, 18 pages.
(Continued)

*Primary Examiner* — Chandrahas B Patel
(74) *Attorney, Agent, or Firm* — Nokia Technologies OY

(57) ABSTRACT

A method and apparatus are provided. Channel estimation related parameters of a network entity of a communication system are configured based on a current configuration of the communication system. The channel estimation related parameters are parameters associated with the estimation of channel information of a channel between the network entity and a further network entity.

17 Claims, 6 Drawing Sheets

(56) References Cited

OTHER PUBLICATIONS

Simeone et al., "Adaptive Pilot Pattern for OFDM Systems", IEEE International Conference on Communications, vol. 2, Jun. 20-24, 2004, pp. 978-982.

Wu et al., "Proposed E-MBS Zone Specific Pilot Patterns", IEEE 802.16 Broadband Wireless Access Working Group, IEEE Draft, IEEE C802.16m-09/1285, Jul. 6, 2009, pp. 1-6.

\* cited by examiner

CONFIGURATION OF CHANNEL ESTIMATION RELATED PARAMETERS

RELATED APPLICATION

This application was originally filed as PCT Application No. PCT/EP2013/069961 filed Sep. 25, 2013.
The above stated application is hereby incorporated herein by reference in its entirety.

The present application relates to activities associated with the estimation of channel information in a communication network. In particularly but not exclusively so, the present application relates to the configuration of network entities involved in channel estimation.

A communication system can be seen as a facility that enables communications between two or more entities such as a communication device, e.g. mobile stations (MS) or user equipment (UE), and/or other network elements or nodes, e.g. Node B or base transceiver station (BTS), associated with the communication system. A communication system typically operates in accordance with a given standard or specification which sets out what the various entities associated with the communication system are permitted to do and how that should be achieved.

Wireless communication systems include various cellular or other mobile communication systems using radio frequencies for sending voice or data between stations, for example between a communication device and a transceiver network element. Examples of wireless communication systems may comprise public land mobile network (PLMN), such as global system for mobile communication (GSM), the general packet radio service (GPRS), the universal mobile telecommunications system (UMTS), the Long Term Evolution (LTE) or the Long Term Evolution Advanced (LTE Advanced).

A mobile communication network may logically be divided into a radio access network (RAN) and a core network (CN). The core network entities typically include various control entities and gateways for enabling communication via a number of radio access networks and also for interfacing a single communication system with one or more communication systems, such as with other wireless systems, such as a wireless Internet Protocol (IP) network, and/or fixed line communication systems, such as a public switched telephone network (PSTN). Examples of radio access networks may comprise the UMTS terrestrial radio access network (UTRAN) and the GSM/EDGE radio access network (GERAN), the Long Term Evolution (LTE) or Long Term Evolution Advanced (LTE Advanced) radio access Evolved UTRAN or EUTRAN.

A geographical area covered by a radio access network typically is divided into cells defining a radio coverage provided by a transceiver network element, such as a base station, Node B or corresponding access point. A single transceiver network element may serve a number of cells. Additionally, a cell may be considered a macro-cell and comprise one or more small cell access points in addition to the macro-cell access points. These small cell access points may provide access for terminals or user equipment within the macro cell.

A user equipment, mobile station or user device may be provided with access to applications supported by the core network via the radio access network.

Communication between entities of the RAN may take place over channels. Channel measurements relating to for example a channel quality may be carried out and reported in order to manage the communication. For example channel measurements may be used for example to provide the scheduling of traffic between entities or the handover of an entity from one access point to another.

In order to facilitate such measurement, the access points may transmit reference symbols which may be used to determine the channel quality at a receiving entity.

According to a first aspect of the present application, there is provided a method comprising: configuring channel estimation related parameters of a network entity of a communication system based on a current configuration of the communication system; wherein the channel estimation related parameters are parameters associated with the estimation of channel information of a channel between the network entity and a further network entity.

The current configuration of the communication system may be indicative of channel estimate characteristics required for resource management of the system. The channel estimate characteristics may be indicative of the amount of acceptable interference in the channel.

The current configuration of the communication system may correspond to at least one of: the resource usage of the communication system; the number of channels in the communication system; and the type of channels in the communication system. The resource usage may correspond to the usage of transmit resources for uplink and downlink transmission.

A type of a channel may be one of: a channel between access points of the communication system; a channel between an access point and a user equipment of the communication system; and a channel between user equipment of the communication system.

The configuring channel estimation related parameters of a network entity of a communication system may comprise: configuring a set of reference symbols to be transmitted by the network entity;

The set of reference symbols may be a reference signal. The reference signal may be selected from a set of orthogonal reference signals.

Configuring a set of reference symbols to be transmitted by the network entity may comprise at least one of: identifying the set of reference symbols to be transmitted by the network entity; configuring a layout of the set of reference symbols; and identifying an interval in which the set of reference symbols is to be transmitted. The layout of the set of reference symbols may correspond to a density of the set of reference symbols.

Configuring a set of reference symbols to be transmitted by the network entity may comprise configuring the network entity not to transmit any reference symbols.

Identifying the set of reference symbols to be transmitted by the network entity may further comprise: identifying the network entity as a potential far off interferer; and configuring the network entity to transmit a set of reference symbols associated with far off interferers.

Configuring channel estimation related parameters of a network entity of a communication system may comprise: configuring parameters used by a network entity to estimate channel information for a channel between the network entity and the further entity.

The parameters may be at least one of: an identity of channels for which the network entity is to generate the estimation of channel information; an accuracy of an estimate of channel information; a form in which the channel estimate is to be generated; a time window over which the channel estimate is to be averaged; a particular form of interpolation/extrapolation to be applied and an interval at which an estimation of channel information is to be generated.

An identity of channels for which the network entity is to generate the estimation of channel information may indicate that the network entity is configured such that the network entity does not generate any channel information.

Channel estimates comprising estimated channel information may be generated for each of a plurality of channels and configuring the channel estimation related parameters comprises: identifying a subset of the channel estimates to be used for the calculation of interference rejection capable receive filters.

Identifying the subset of channel estimates may comprise identifying the subset of channel estimates in dependence on at least one of: an estimated power of a channel estimate; an estimated interference related to a channel estimate; and whether the channel estimates are for channels forming part of a cooperation area of the network entity.

Configuring channel estimation related parameters of a network entity of a communication system may comprise: configuring parameters used by the network entity to report an estimate of channel information.

The parameters are at least one of: an identity of channels for which an estimation of channel information is to be reported; an accuracy of the report; a form in which the report is to be generated; and an identity of the entities to which the report is to be transmitted. The form in which the report is to be generated may comprise an interval in which the reports are to be transmitted. The accuracy of the report may comprise a granularity at which the report is to be generated. The identity of channels for which an estimation of channel information is to be reported may correspond to a predetermined number of further network entities creating the greatest interference.

According to a second aspect, there is provided a communication system comprising: a first network entity; a second network entity having a communication channel with the first network entity; and a configuration entity operable to configure channel estimation related parameters of at least one of the first network entity and second network entity based on a current configuration of the communication system; wherein the channel estimation related parameters are parameters associated with the estimation of channel information of the channel between the network entity and a further network entity.

The configuration entity may be operable to configure channel estimation related parameters of the first network entity and the configuring channel estimation related parameters comprises configuring a set of reference symbols to be transmitted by the first network entity.

The configuration entity may be operable to configure channel estimation related parameters of the second network entity and the configuring channel estimation related parameters comprises at least one of: configuring parameters used by the second network entity to estimate channel information for a channel between the network entity and the further entity; and configuring parameters used by the second network entity to report an estimate of channel information.

According to a third aspect, there may be provided an apparatus comprising a processor and at least one memory, the processor and the memory configured to: configure channel estimation related parameters of a network entity of a communication system based on a current configuration of the communication system; wherein the channel estimation related parameters are parameters associated with the estimation of channel information of a channel between the network entity and a further network entity.

The processor and memory may be further configured to configure a set of reference symbols to be transmitted by the network entity.

The processor and memory may be further configured to: identify the network entity as a potential far off interferer; and configure the network entity to transmit a set of reference symbols associated with far off interferers.

The processor and memory may be further configured to: configure parameters used by a network entity to estimate channel information for a channel between the network entity and the further entity.

The processor and the memory may be further configured to identify a subset of the channel estimates to be used for the calculation of interference rejection capable receive filters where channel estimates comprising estimated channel information are generated for each of a plurality of channels.

The processor and memory may be further configured to: configure parameters used by the network entity to report an estimate of channel information. The apparatus may be an access point for a network.

According to a fourth aspect, there is provided a method comprising: receiving, by a network entity of a communication system, channel estimation related parameters based on a current configuration of the communication system; wherein the channel estimation related parameters are parameters associated with the estimation of channel information of a channel between the network entity and a further network entity.

According to a fifth aspect, there is provided an apparatus of a communication system, comprising a memory and a processor, the memory and processor configured to: receive channel estimation related parameters based on a current configuration of the communication system; wherein the channel estimation related parameters are parameters associated with the estimation of channel information of a channel between the network entity and a further network entity.

The apparatus may be a network entity.

It should be appreciated that at least any one of the features discussed in relation to any of the aspects may be used in conjunction with one or more other aspects.

Embodiments will now be described in further detail, by way of example only, with reference to the following examples and accompanying drawings, in which.

Figure 1:
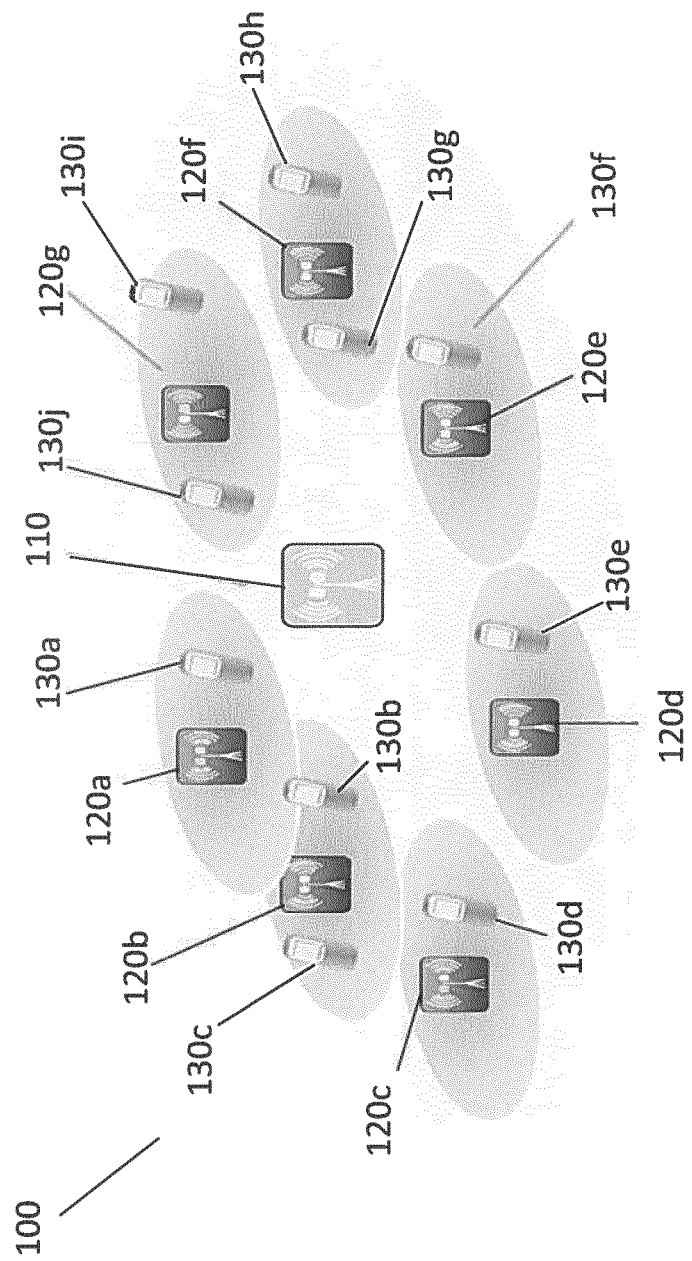
FIG. 1 shows an example of a communication network.

FIG. 1 shows an example of a macro cell 100 within a radio access network. The macro cell 100 is provided with a macro access point 110 and a plurality of small cell access points 120*a* to 120*g* providing smaller areas of coverage within the macro cell 100. A plurality of terminals 130*a* to 130*j* within the macro-cell 100 are served by the macro access point 110. It will appreciated that the terminals may be served directly by the macro cell access point 110 or by the macro access point 110 indirectly via the smaller access points 120*a* to 120*g*.

In order to control communication within the macro cell and in the communication system as whole, entities in the communication system may provide channel information relating to measurements on communication channels on which they may potentially communicate. In order to facilitate this, an entity may transmit reference symbols, for example in the form of a pilot signal that may be received and measured by other entities in the system.

This model may be implemented in communication systems in which entities communicate strictly in a hierarchical manner—in other words user equipment or devices communicate only with access points. Systems with strictly hierarchical communications may use a rather fixed configuration of reference symbols and channel reporting concepts, which have been optimized for classical base station to device communications with the assumption that in each cell the same resources are used for either uplink or downlink communication.

In the embodiment of FIG. 1 however direct device-to-device transmission may be possible. In other words, in addition or alternatively to communication with an access point, the devices (or terminals) 130*a* to 130*j* of FIG. 1 may communicate directly with each other.

In this case, channel information on a larger set of point-to-point links is required to operate the system. For example coarse channel information for performing scheduling may be required as well as detailed channel information for transmitter and receiver side signal processing and decoding. In such a system information on the direct links between adjacent access points and/or the direct links between devices in the same cell or different cells may be useful.

In systems such as that of FIG. 1, there may be a large extent of direct device-to-device transmission. This requires that different communicating entities also obtain information on direct links between base stations, or direct links between devices.

Scaling the reference symbol and channel estimation and reporting concepts used in strictly hierarchical systems in order to be implemented in such systems may be inappropriate as this would lead to an unreasonably high reference symbol, channel estimation and channel reporting overhead.

For example, in the system of FIG. 1, not all channels may need to be estimated at the same accuracy or in the same interval in time (for instance, the link between two access points may hardly ever change—maybe only when a door is opened or closed between the APs). Also, in a time division duplex (TDD) system some link information may be derived via reciprocity. In such a system, not all communicating entities need necessarily transmit reference symbols or estimate channels.

Embodiments of the present application may configure channel estimation related parameters of a network entity dynamically. In one embodiment the parameters configured may correspond to the reference symbols to be transmitted by a network entity and to be used by another entity for channel estimation. In another embodiment the parameters may correspond to the estimation of channel information (for example based on received reference signals) or, in another embodiment, may correspond to the reporting of channel estimates.

The configuration of these parameters may be based on a current configuration of the communication system. For example the current configuration of the communication system may relate to the number of device to device communications, number of channels, topographical layout etc. In this manner for example, only the required channels may be estimated at a required accuracy of the estimate.

In embodiments, a trade-off between reference symbol, channel estimation and channel reporting overhead and system performance may be obtained and tailored to a large variety of communication scenarios.

Some examples of the present application may therefore dynamically configure the usage of reference symbols for different forms of channel estimation, and dynamically configure which entities shall estimate which links at which accuracy and forward which link information at which accuracy to which entity in the system.

In embodiments, a configuration entity, for example a macrocell access point, small cell access point, terminal or other network entity, may configure entities in the network using channel estimation related parameters. The network entities may then carry out functions relating to channel estimation based on these parameters. These functions may for example relate to the transmission of reference symbols from which channel estimates are generated, the generation of channel estimates, the use of channel estimates and/or the reporting of channel estimates.

It will be appreciated that each of the above network entities may comprise a processor and at least one memory for carrying out one or more of the steps discussed in relation to embodiments.

Figure 2:
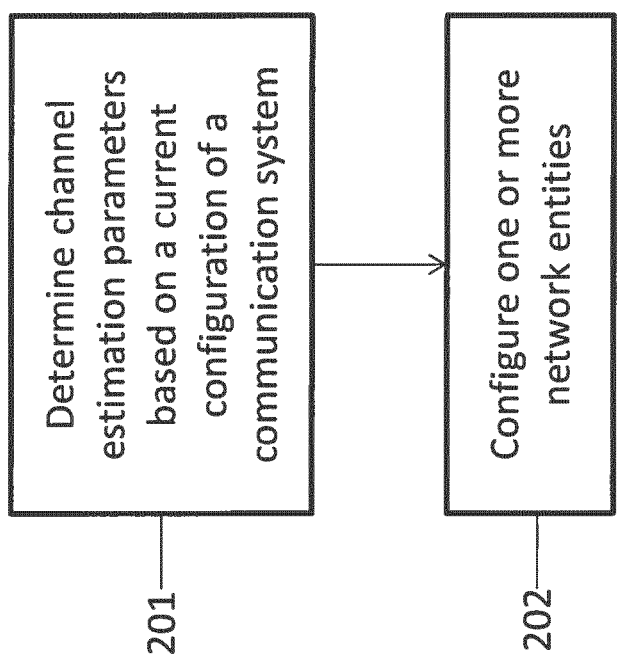
FIG. 2 is a flow diagram depicting method steps of some embodiments.

FIG. 2 shows an example of the method steps that may be carried out by a configuration entity to configure channel estimation related parameters of a network entity. The channel estimation related parameters may relate to the generation and/or use of channel estimates relating to channels between the network entity and further network entities.

At step 201 of FIG. 2, channel estimation related parameters may be determined based on a current configuration of a communication system in which the method takes place.

The current configuration of the system may for example relate to the type and layout of the system and thus give a good indication of the resource requirements of the system. The current configuration of the communication system may be for example the resource usage of the communication system, for example the usage of transmit resources for uplink and downlink transmission.

The current configuration of the system may also or alternatively relate to the number of channels in the communication system for example to be taken into account when assigning resources and/or the type of channels in the communication system.

In the example of FIG. 1, it can be seen that the type of channels in the system may be for example a channel between two access points of the communication system, a channel between an access point and a user equipment of the communication system and/or a channel between user equipment of the communication system.

The current configuration of the system may be any characteristics of the system that are indicative of the requirements of the system for resource management to be carried out. For example, resource management may be based on channel estimates and the current configuration of the system may be indicative of channel estimates characteristics required to carry out the resource management. The channel estimate characteristics may for example be indicative of an amount of acceptable interference in the channel.

For example, the current configuration may be such that channel estimates are not required for all the channels in the system and/or that the same level of accuracy of a channel estimate is not required for all the channels in the system.

At step 202 of FIG. 2, the configuration entity may configure one or more network entities based on the channel estimation related parameters. In this manner, it can be seen that parameters relating to the estimation of channel information between network entities may be dynamically configured while taking into account the configuration of the system in which the channels operate.

In one example, the resource management may relate to the scheduling of data on the channels. The channel estimate characteristics may be the characteristics of the channel estimates that a scheduling entity requires in order to make efficient scheduling decisions. For example the characteristics may relate to an accuracy of a channel estimate, a form of the channel estimate, which links the channel estimate is generated for and/or the density of the reference symbols from which the estimate is generated.

Such characteristics in some embodiments may be determined based on a knowledge of the system environment in which the entities are. For example the configuration entity may have knowledge of the implementation environment based on measurements of the surrounding environment. The configuration entity may also be aware of the context of the communications taking place in the system environment. For example the configuration entity may be aware of a number of femto cells or device to device communications taking place or having the potential to take place. Alternatively or additionally, the determination of the characteristics may be based on the location of network entities within the system environment.

Figure 3A:
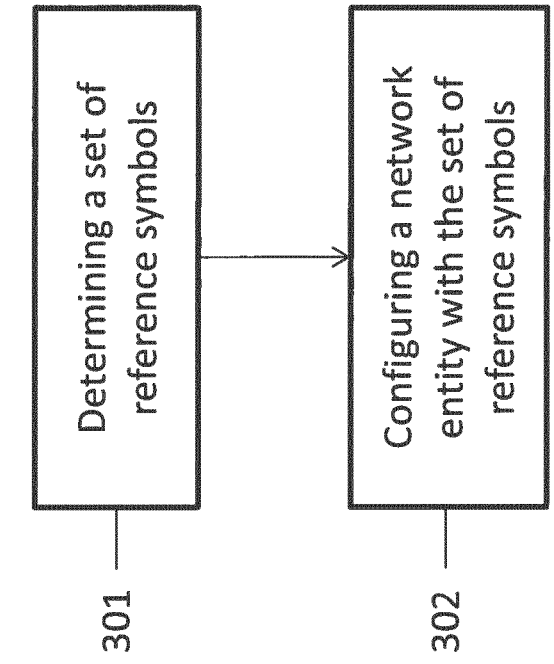
FIG. 3A is a flow diagram depicting the method steps of a first embodiment.
Figure 3C:
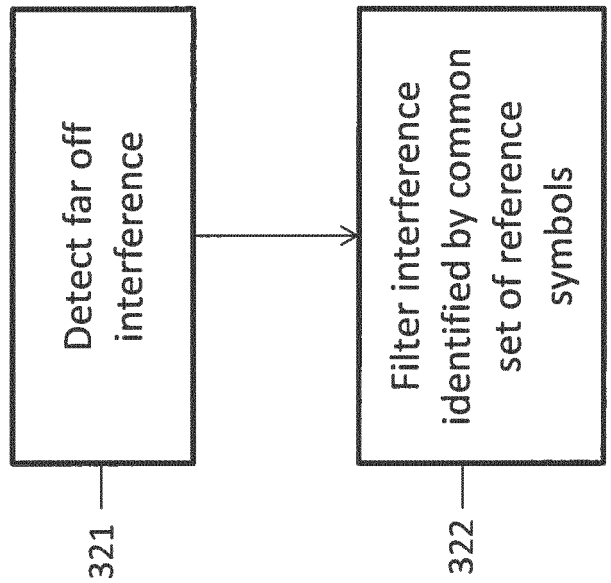
FIGS. 3B and 3C are flow diagrams depicting further method steps associated with the first embodiment.
Figure 3B:
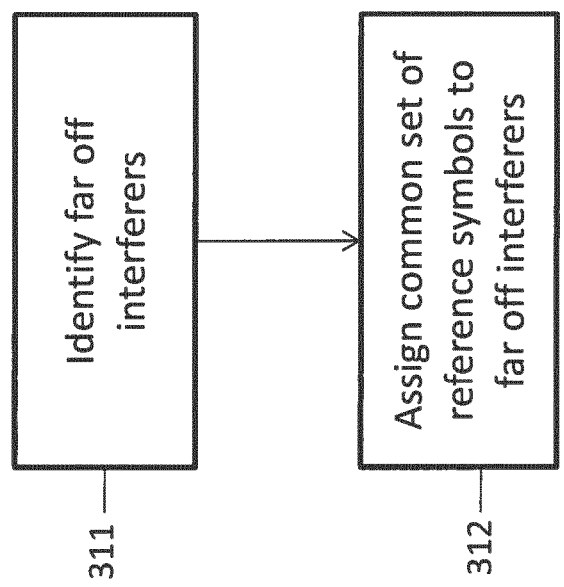

In a first embodiment, the channel estimation related parameters may correspond to a set of reference symbols to be transmitted by a network entity. It will be appreciated that the set of reference symbols may be used by other network entities to generate channel estimates. In a further example of the first embodiment, the reference symbols may be selected in response to determining that a network entity is a far-off interferer. FIGS. 3A, 3B and 3C show example method steps associated with this first embodiment.

At step 301 of FIG. 3A, a set of reference symbols to be transmitted by a network entity is determined. The set of reference symbols may be determined by channel estimation characteristics based on a current configuration of the communication system.

The set of reference symbols may form a reference or pilot signal which the network entity may then transmit and for example, other network entities may generate channel estimates based on the receive set of reference symbols. The reference signal may be selected from a set of orthogonal reference signals.

The configuration entity may configure the network entity with channel estimation related parameters. These channel estimation related parameters identify the set of reference symbols and/or characteristics of set of reference symbols.

These characteristics may be for example a layout of the set of reference symbols, for example a density of the set of reference symbols. For example, a higher density of the set of reference symbols may relate to a more detailed estimate and a lower density of the set of reference symbols may relate to a coarser estimate.

The characteristics of a set of reference symbols may also or alternatively be for example an interval in which the set of reference symbols is to be transmitted.

It will be appreciated that identifying the reference symbols in some embodiments may identify that no reference signal is to be transmitted.

In an example of the first embodiment, configuring the network entity with respect to a set of reference symbols may be used in a situation where the system is affected by far-off interferers.

In assigning sets of reference symbols to entities on a network, a scheduling or configuration entity may allocate the sets of reference symbols to entities in a manner so that a set of reference symbols may be reused after some distance. For example the set of reference symbols may be reused when they are out of interference range of an entity using an identical set of reference symbols. Reallocating the reference symbols works well in many cases (for example for 95% of the user equipment or terminals) however in some cases, effects such as wave guiding may affect very far off user equipment or terminals or small cells or terminals might interfere with other terminals.

This interference may be for example overcome with a terminal or user equipment suppressing this interferer by filtering at a receiver. If accurate channel knowledge of the interferer is known then the suppression of the interference may be improved. In an embodiment of the present application, the dynamic configuration of sets of reference symbols may be used to configure a certain set of reference symbols for far off interferers. By associating a set of reference symbols with a far off interferer, an interfered with entity may have knowledge of the set of reference symbols used by the far off interferer.

For example far off interferers (or potential far off interferers) may be identified by their location (e.g. those located at long streets etc) or position in the system environment. The configuring entity may configure the identified far off interferers to use a set of reference symbols common to far off interferers. Other network entities may then use this common set of reference symbols for their interference rejection combining (IRC) receiver.

In this example an interfered-with terminal would not have to know anything more about the interfering cell. In some examples, it may even suppress more than one far off interferer as this common set of reference symbols sent from more than one eNB will form a single frequency network.

For example, the step of identifying the set of reference symbols to be transmitted by the network entity of FIG. 3A further may comprise identifying the network entity as a potential far off interferer and then configuring the network entity to transmit a set of reference symbols associated with far off interferers.

FIG. 3B shows the method steps of a configuration entity associated with this embodiment.

At step 311, one or more far off interferers are identified. 'Far off interferers' can be for example macro BS, small cells or relay nodes.

At step 312, a common set of reference symbols are assigned for use by the far off interferers. This common set of reference symbols may be specific network wide predefined reference signals, for example a channel state information reference signal (CSI RS) for a specific antenna port, which have been reserved for estimation of far off interferers and will be not used otherwise in the cells.

FIG. 3C shows an example of the method steps carried out by a terminal or receiving entity. At step 321 a far off interferer is detected. It will be appreciated that in some embodiments the interferer may not be explicitly detected but may be detected through experienced interference. For example, an user equipment may enter a street or location being strongly interfered by such a far off interferer.

At step 322, the terminal may filter the interference identified by the common set of reference symbols assigned to the far off interferers. For example, the terminal may use the network wide known 'far off CSI RSs' for an accurate channel estimation, which in turn can be used for example for an advanced interference rejection combining filter.

In these embodiments, the terminals do not have to know any cell ID or UE scrambling ID for the channel estimation, as there will be only one—or potentially few—such far off CSI RS, scrambled by a single and fixed cell ID and being known in the whole network. If a terminal is disturbed by a far off interferer it can directly and individually react and aim at mitigating this interferer without any further interaction with the serving base station.

In some embodiments, relevant 'far off CSI IDs' (including physical resource allocation) may be announced individually per cell, for example in specific broadcast of multicast messages.

In some embodiments the overhead associated with far off interferer CSI RSs may be reduced by limiting the transmission to radio stations placed at critical locations like crossings of long streets etc. Based on context aware information of the system environment, a further identification and configuration of far off interferers may be helpful to avoid overlapping of the same set of far off interferer reference symbols and/or to allow for IRC processing of more than one far off interferer.

In one example, the radio station has more than one antenna one might apply the far off CSI RSs to a set of antennas forming virtual beams. The virtual beams might either have the same direction as the transmission of the user plane data or might be directed in such a way into the street that the receive power for CSI estimation will be maximized later on.

Figure 4:
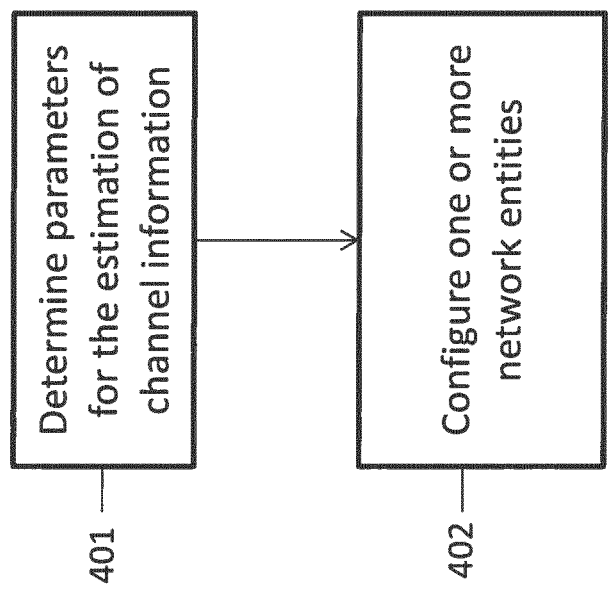
FIG. 4 is a flow diagram depicting the method steps associated with a second embodiment.

Referring back to FIG. 2A, in a second embodiment the the channel estimation related parameters may correspond to parameters used by a network entity for the generation of channel estimates. This embodiment is shown in the method steps of FIG. 4.

At step 401, one or more parameters to be used by a network entity to estimate channel information for a channel between the network entity and the further entity are determined. At step 402, the configuring entity configures one or more network entities with the determined parameters.

The parameters in the embodiment of FIG. 4A may be parameters relating to how the estimate of channel information is generated. For example the parameters may be one or more identities of channels for which a network entity is to generate the estimation of channel information, an accuracy of an estimate of channel information, a form in which the channel estimate is to be generated, a certain time over which the channel estimate is averaged, a certain form of inter- or extrapolation to be applied, and/or an interval at which an estimation of channel information is to be generated.

It will be appreciated that the identities of channels for which a network entity is to generate the estimation of channel information may be determined such that a network entity does not generate any channel information.

In some embodiments, a network entity may comprise a receive filter with interference rejection capabilities. This filter may be configured to reject certain interference. In a further embodiment of the present application, the configuring entity may configure the network entity to identify which channel estimates to use in the calculation of such a filter. It will be appreciated that while the channel estimates used to calculate a filter may be generated in accordance with the embodiment of FIG. 4, they may be estimated in another manner.

In this embodiment, channel estimates may be generated for a number of channel and the channel estimation related parameters may identify a subset of the channel estimates to be used for the calculation of interference rejection capable receive filters.

In some embodiments, the subset of channel estimates selected may be based on for example the estimated power in a channel estimate and/or an estimated interference of a channel estimate.

Some systems may use joint precoding solutions, for example where pre-coded data is simultaneously transmitted from several access points to several mobile terminals. Such systems have cooperation areas (CAs) in which such joint precoding is implemented. In such a system, in a further embodiment, the subset of channel estimates selected may be based on whether the channel estimates are for channels forming part of a cooperation area of the network entity.

Figure 5:
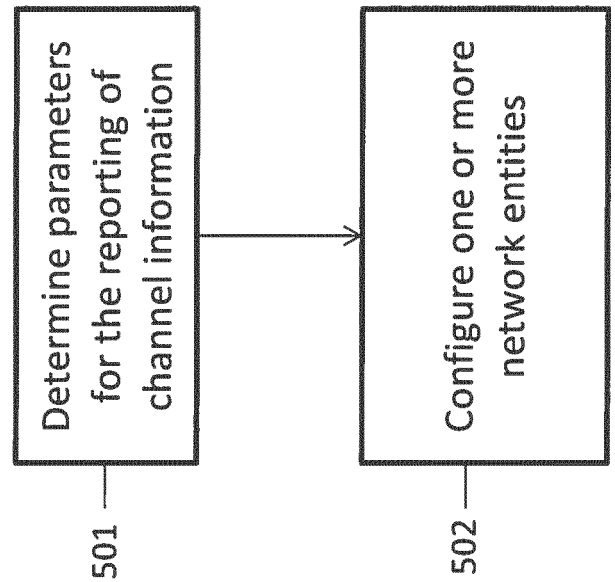
FIG. 5 is a flow diagram depicting the method steps associated with a third embodiment.

Referring back to FIG. 2A, in a third embodiment the channel estimation related parameters may correspond to parameters used by the network entity to report channel estimates. FIG. 5 shows an example of the method steps associated with this embodiment.

At step 501 parameters for the reporting of channel estimates are determined and at step 502 one or more network entities are configured with parameters used by the respective network entities to report an estimate of channel information.

The parameters for reporting channel estimates may be for example, an identity of channels for which an estimation of channel information is to be reported, a level of accuracy of the channel estimate report, for example how accurate and/or detailed the channel estimate is to be in the report, a form in which the report is to be generated, and/or an identity of network entities to which the report is to be transmitted. For example, the report may be transmitted to only entities in a higher level of the hierarchy or for example the other entities with the largest interference on the reporting network entity.

The form in which the report is to be generated may be for example an interval in which the reports are to be transmitted. The accuracy of the report may be for example a granularity at which the report is to be generated.

The configuration of the reference symbols and the generation and/or reporting of channel estimation may be implemented in some illustrative embodiments as described below.

For example, the configuration of the reference symbols in some embodiments may be used to configure a communicating entity to not transmit reference symbols (which could be implemented in the case of small cells which in some cases are to be transparent to the UEs), or to transmit reference symbols only at certain intervals in time.

The configuration of reference symbols may also for example be used to configure multiple communicating entities to use the same reference symbols, for use for example in the case of a single frequency network (SFN).

The configuration of reference symbols may also be used to configure different densities of reference symbols for example coarse or more accurate channel estimation on a per-transmitter basis (or even on per-link basis in the context of decoding reference symbols). This may for example allow different base stations to use different reference symbol layouts and/or densities.

In current systems, UEs may report a specific set of channel information (for example coarse information on the links to surrounding cells and detailed channel information for the serving link for the purpose of precoding) to their assigned base station. In embodiments of the present application, the identity of links that any network entity may estimate may be flexibly configured. Which information and in which form it should be forwarded to which other entity in the system may also be configured (for instance, it may be important that channel information is not only reported to the serving base station, but also to another network entity for the purpose of centralized radio resource management).

Figure 6:
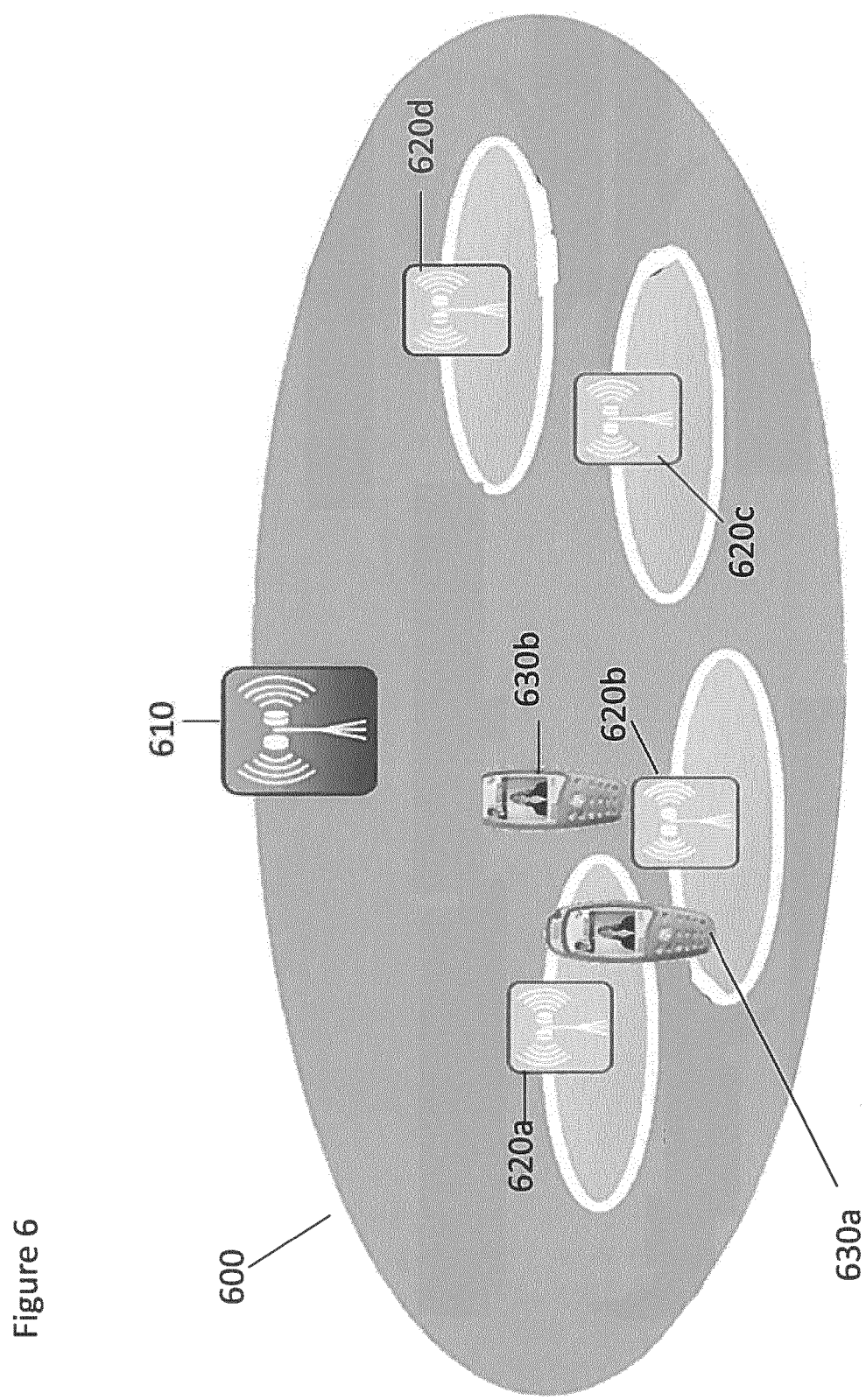
FIG. 6 shows an example of a communication network in which embodiments may be implemented.

FIG. 6 shows an example of the dynamic configuration of a macro cell having four small access points and two user equipment. It will be appreciated that this is by way of example only and embodiments may be applicable to other numbers of small access points and user equipment.

FIG. 6 comprises a macro cell 300 having a macro cell access point 610, four small access points 620a to 620d and two user equipment 630a and 630b. Channel measurements may be carried out with respect to any of the entities 610, 620a to d, 630a and b in the macro cell 600. In order to carry out channel measurements, the entities in the macro cell may transmit reference symbols.

In accordance with embodiments, each of the user equipment 630a and 630b and each of the small access points 620a to 620d may be dynamically configured. The configuration for each entity may include one or more of the following:

i) configuration of the reference symbols
ii) configuration of which links to carry out estimation for
iii) configuration of channel estimate reporting
iv) configuration of interference filters based on channel estimates The configuration of the reference symbols may comprise configuring an entity (for example the user equipment and/or small access point) to transmit reference symbols. It will be appreciated that each entity may comprise one or more antennae's and a sequence of reference symbols providing the pilot signal may be configured for each antennae. Alternatively, all or at least two antennaes of an entity may be configured to transmit the same sequence of reference symbols. In some embodiments multiple entities may be configured to transmit a pilot signal in the same manner. For example, more than one entity may be configured to transmit a specific sequence of reference symbols.

The configuration of the reference signal may additionally or alternatively comprise configuring the density of transmission of reference symbols on the pilot signal.

The density of the reference signal may be proportional to the overhead required for the reference signal. For example, a typical time-frequency grid being used in LTE might be more or less sparse in time (e.g. every $10^{th}$ instead of every $5^{th}$ or every symbol) and/or frequency (e.g. every $12^{th}$ instead of every $6^{th}$ sub carrier).

The density of the reference symbols may be configured to correspond to an accuracy of the channel estimation. For example, less dense reference symbols may correspond to a coarse estimate while denser symbols may correspond to a more detailed channel estimation. Note that we here refer to any kind of reference symbols, which can be for example reference symbols for the purpose of course link classification (for example for radio resource management), reference symbols for the purpose of channel feedback (for example for calculation of precoding vectors such as CSI RS), or reference symbols for the purpose of data demodulation (for example Data Modulation Reference Signals (DM RS)).

The configuration of which links to carry out estimation for may comprise configuring an entity to carry out channel estimates for one or more links. A link may correspond to a communication channel between the entity and a further entity. The configuration may comprise identifying the received set of reference symbols or pilot signal on which the entity is to carry out a channel estimation. It will be appreciated that channel estimation need not be carried out on all the communication channels that are detected by an entity and this configuration identifies for which channels estimates should be carried out.

The entity may further be configured to identify which channel estimates to report and when to report these estimates. For example, the entity may be configured to identity or set an interval at which to report channel estimates. Additionally or alternatively a content of the reported estimates may be set, for example a granularity of the channel estimate values to be reported may be set. The granularity may range from detailed complex channel coefficients (possibly captured via codebooks) over 5-bit channel quality indication (CQI) representation to a 1-bit representation indicating whether a link is "relevant" or "not relevant"). It will be appreciated that the content and interval of the reports may be set according to which further entity the measuring entity is reporting to.

In one example, the measuring entity may be configured to report only the N strongest links it has estimated, or only links with a quality beyond a certain threshold.

The configuration of which estimated channels to use for the calculation of interference filters may also be carried out. In this case, the entity may implement interference rejection capabilities in its receive filters in order to reduce received interference. The entity may be configured to use a particular subset (identified in the configuration) of estimated channels for the calculation of the inference rejection capable receive filters.

FIG. 6 shows the example where each of the entities 620a to d and 630 *a* and *b* have been configured dynamically for channel estimation and reporting. In this example, while the entities may have two or more transmit antennas, they are configured to use the same reference symbols for all transmit antennas (such that any other communicating entity can estimate the average link across all antennas). In the example of FIG. 6, the small access point 620c and 620d are operating in a single frequency network (SFN) mode and so have been configured to use the same reference symbols. This may be for example due to instantaneously low load in these cells.

The user equipment 630a is configured to estimate the link to cells 1 and 2 on transmission time interval (TTI) basis and report this to both cells on the same time scale in order to enable fast cell switching The user equipment 630a and 630b are configured to alternatingly estimate the mutual link between them and report this to both the involved small access points 320a and 320b as well as to the macro cell 610.

The small access points 620a and 620b are configured to alternatingly estimate the mutual link between them at rare intervals (as this link may rarely change) and report this to the macro cell 610.

It can be seen from FIG. 6 that the entities in the macro cell may be configured with respect to channel estimation and reporting dynamically.

The configuration of entities dynamically in terms of channel estimation, such as the example of FIG. 6, may allow channel estimation to be tailored to specific situations and may balance the reference symbol, channel estimation and channel reporting overhead and system performance.

In another example, the set up of channel estimation in a case of twenty terminals in close proximity which could benefit from direct device-to-device (D2D) communication may be used to illustrate such reference symbol, channel estimation and channel reporting overhead and system performance balancing.

In such a case, a scheduling entity may require link information between all tuples of terminals on physical resource block (PRB) granularity in order to perform scheduling decisions for the D2D communication. In some systems the method of providing this would be to have:
- all terminals transmit orthogonal reference symbols at the granularity which is finally needed by the scheduling entity
- all terminals perform channel estimation towards all other terminals
- Reporting the $20^2/2*N_{prb}$ link measurements to the scheduling entity (where $N_{prb}$ is the number of PRBs for which this reporting takes place)

However embodiments of the present application may provide a reduced reference signal, channel estimation and reporting overhead while providing similar system performance.

Figure 7:
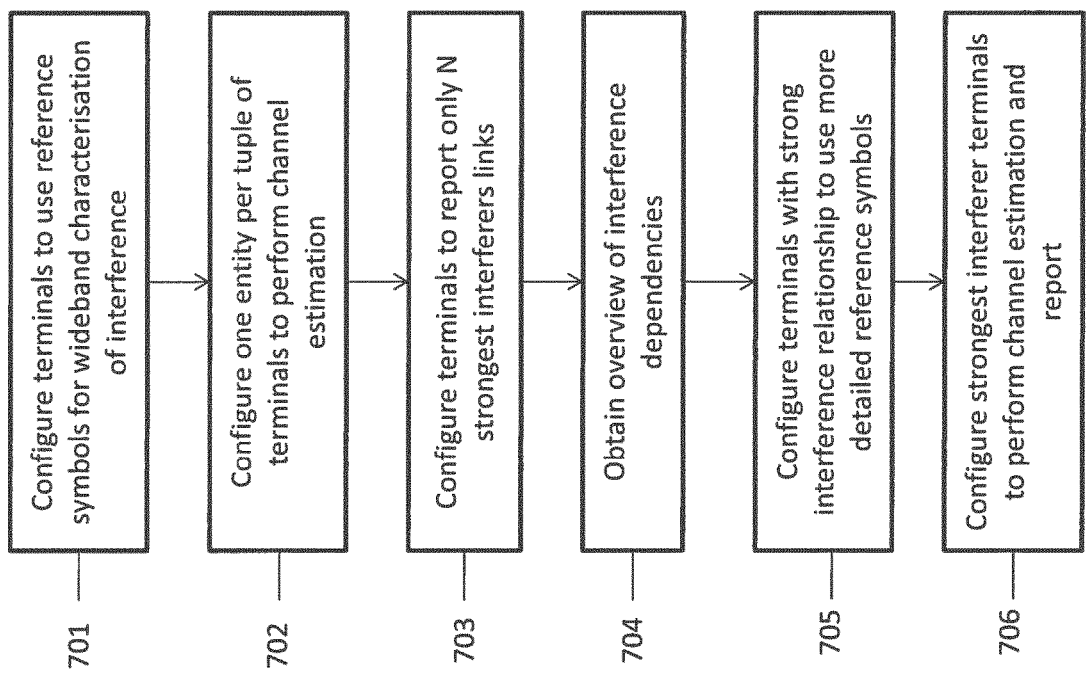
FIG. 7 is a flow diagram depicting the method steps of an example implementation of some embodiments.

FIG. 7 shows an example of the methods steps implemented in an embodiment of the present application in a case where twenty terminals in close proximity which could benefit from direct device-to-device (D2D) communication are to be set up for channel estimation and reporting.

In the embodiment of FIG. 7, a scheduler or other control entity may configure the terminals to first provide coarse estimates of the channel quality experienced. This may be carried out by configuring the terminals to use a coarse form of reference symbols. The reference symbols may be sufficient to obtain a wideband characterization of interference. Using these coarse reference symbols initially may reduce the reference symbol overhead. This is shown at step 701.

The terminals may be grouped into tuples and for each tuple, the scheduler may configure only one entity to perform the channel estimation, if for instance time division duplex (TDD) is applied. This is because, in time division duplex (TDD) channel reciprocity would be applicable. This may reduce the channel estimation processing on average by a factor of 2. This step can be seen at step 702. However it will be appreciated that that other types of communication channels may be used.

The terminals may further be configured to report only the estimated links related to a few strongest interferers to the scheduling entity. For example the terminal of the tuple carrying out channel estimation may calculate a channel estimate for each link of that terminal. Only the links associated with the strongest interferers may be reported. For example the scheduler may configure the terminal to report only the N biggest interferers experienced by that terminal. It will be appreciated that N may be any number appropriate for the system. This is shown in step 703. Such a step may reduce the reporting overhead.

At step 704, the scheduler may obtain an estimate of interference dependencies between terminals. This may be based on the reported channel estimates for the N biggest interferers for a terminal generating the estimates. It will be appreciated that these received estimates may be based on the coarse reference symbols. The scheduler may then obtain an estimate of the interference dependencies between all 20 terminals.

At step 705 the scheduler may identify and configure those terminals that have a strong interference relation to at least one other terminal to use more detailed reference symbols. It can here assign the same reference symbols to those terminals that in any way have no interference relation. This may reduce the overall reference symbol overhead involved. Reusing the same set of reference symbols in another area without generating mutual interference may help to control the overhead as available in total, the system may have to provide less orthogonal reference symbol sequences, leaving more resources for the actual data transmission.

At step 706, the scheduling entity may configure any terminals having a strong interference relationship to at least one other terminal to perform channel estimation based on the more detailed reference symbols. This may allow the identified terminals to provide a more accurate channel estimate. The scheduling entity may also configure the content of the channel estimation reports from these terminals. For example, the terminals may be configured to report this information at physical resource block (PRB) granularity to the scheduling entity.

In this manner, the scheduling entity may make scheduling decisions based on accurate channel estimates from terminals identified as having a high interference effect on at least one other terminal in the system without having to have each terminal in the system provide detailed channel estimates.

In FIG. 7, embodiments of the present application are used to determine interference provided by terminals in a macro-cell. Embodiments may also or alternatively be used to determine so-called far-off interference.

In general, the configuration of any communication entity to use a particular form of reference symbols, channel estimation processes and/or channel reporting processes, or to use certain channel estimates for receive filter calculation, may be performed by any access node in the system (e.g. macro cell, small cell etc.). This configuration may take place via over-the-air control signalling or via any other means if available (e.g. a macro cell may configure a small cell also via wireline communication or any multi-hop wireless link if available).

It will be appreciated that in embodiments, there may be a certain number of orthogonal reference symbols (where orthogonality may be obtained in time, frequency or code) which can be used for the transmission from any network entity and on any transmit antenna. It may also be possible to use different densities of reference signals, for instance reference signals with a different spacing in frequency, such as to allow for coarse link/channel estimation at a low reference symbol overhead or detailed channel estimation at a higher overhead.

Embodiments may be applicable to system environment in which there are cells covering a larger geographical area (for example macro cells), and a high number of small cell access points (covering smaller geographical areas) and terminals. For example a macro cell may have a number of small cells and terminals under its coverage.

It will be appreciated that the foregoing is by way of example only and various modifications may be made to the embodiments. For example the configuration of the network entities may be in some embodiments carried out over an air interface, for example in the case of an access point configuring a terminal, or may be carried out over a wired interface, for example an access point configuring another access point with which it shares a wired link.

It will be appreciated that while the foregoing has exemplified the type of channel estimate parameters that may be configured, for example the channel estimate parameters may relate to a set of reference symbols to be transmitted, how to generate a channel estimate and/or how to report channel information, the parameters may relate to other characteristics of the network in some embodiments. For example, the channel estimation related parameters may relate to legal configurations of a network. For example policy information or network management parameters may be configured dynamically in accordance with some embodiments.

It will also be appreciated that the foregoing may use the terms base station and access point. These terms may be used interchangeably. Additionally the terms mobile station, user equipment and/or terminal may be used interchangeably. It will be appreciated that these may all be examples of network entities.

It will also be appreciated that the configuration of channel estimation related parameters may be done over over-the-air signalling or for example via backhaul signalling. In some embodiments configuration over backhaul signalling may be used for the configuration of access points.

While, in the foregoing, different embodiment have been describe separately, it will be appreciated that one or more combinations of embodiments may be implemented in accordance with the present application.

The invention claimed is:

1. A method comprising:
configuring channel estimation related parameters of a network entity of a communication system based on a current configuration of the communication system;
wherein the channel estimation related parameters are parameters associated with the estimation of channel information of a channel between the network entity and a further network entity;
wherein the configuring channel estimation related parameters of a network entity of a communication system comprises at least one of:
configuring a set of reference symbols and transmitting by a transceiver of the network entity the set of reference symbols;
configuring the channel estimation related parameters used by the network entity and estimating channel information for a channel between the network entity and the further entity; and
configuring the channel estimation related parameters used by the network entity and reporting an estimate of channel information;
wherein identifying the set of reference symbols to be transmitted by the network entity further comprises:
identifying the network entity as a potential far off interferer; and
configuring the network entity to transmit a set of reference symbols associated with far off interferers.

2. The method of claim 1 wherein the current configuration of the communication system is indicative of channel estimate characteristics required for resource management of the system.

3. The method of claim 2 wherein the channel estimate characteristics are indicative of the amount of acceptable interference in the channel.

4. The method of claim 1 wherein the current configuration of the communication system corresponds to at least one of:
resource usage of the communication system;
number of channels in the communication system; and
type of channels in the communication system.

5. The method of claim 4, wherein a type of a channel is one of:
a channel between access points of the communication system;
a channel between an access point and a user equipment of the communication system; and
a channel between user equipment of the communication system.

6. The method of claim 1, wherein the set of reference symbols is a reference signal; and wherein the reference signal is selected from a set of orthogonal reference signals.

7. The method of claim 6, wherein configuring a set of reference symbols to be transmitted by the network entity comprises at least one of:
identifying the set of reference symbols to be transmitted by the network entity;
configuring a layout of the set of reference symbols;
identifying an interval in which the set of reference symbols is to be transmitted; and
wherein the layout of the set of reference symbols corresponds to a density of the set of reference symbols.

8. The method of claim 6 wherein configuring a set of reference symbols to be transmitted by the network entity may comprise configuring the network entity not to transmit any reference symbols.

9. The method of claim 1, wherein the parameters are at least one of:
an identity of channels for which the network entity is to generate the estimation of channel information;
an accuracy of an estimate of channel information;
a form in which the channel estimate is to be generated;
a time window over which the channel estimate is to be averaged;
a particular form of interpolation/extrapolation to be applied and
an interval at which an estimation of channel information is to be generated.

10. The method of claim 1, wherein the parameters are at least one of:
an identity of channels for which an estimation of channel information is to be reported;
an accuracy of the report;
a form in which the report is to be generated; and
an identity of the entities to which the report is to be transmitted.

11. The method of claim 10 wherein the form in which the report is to be generated comprises an interval in which the reports are to be transmitted.

12. The method of claim 10 wherein the accuracy of the report comprises a granularity at which the report is to be generated.

13. The method of claim 10 wherein the identity of channels for which an estimation of channel information is to be reported corresponds to a predetermined number of further network entities creating the greatest interference.

14. A method comprising:
configuring channel estimation related parameters of a network entity of a communication system based on a current configuration of the communication system;
wherein the channel estimation related parameters are parameters associated with the estimation of channel information of a channel between the network entity and a further network entity;

wherein the configuring channel estimation related parameters of a network entity of a communication system comprises at least one of:

configuring a set of reference symbols and transmitting by a transceiver of the network entity the set of reference symbols;

configuring the channel estimation related parameters used by the network entity and estimating channel information for a channel between the network entity and the further entity; and configuring the channel estimation related parameters used by the network entity and reporting an estimate of channel information; and wherein channel estimates comprising estimated channel information are generated for each of a plurality of channels and configuring the channel estimation related parameters comprises:

identifying a subset of the channel estimates to be used for the calculation of interference rejection capable receive filters.

15. The method of claim 14, wherein the identifying the subset of channel estimates comprises identifying the subset of channel estimates in dependence on at least one of:

an estimated power of a channel estimate;

an estimated interference related to a channel estimate; and whether the channel estimates are for channels forming part of a cooperation area of the network entity.

16. An apparatus comprising a processor and at least one memory, the processor and the memory configured to:

configure channel estimation related parameters of a network entity of a communication system based on a current configuration of the communication system;

wherein the channel estimation related parameters are parameters associated with the estimation of channel information of a channel between the network entity and a further network entity wherein configure channel estimation related parameters of a network entity of a communication system comprises at least one of:

configure a set of reference symbols and transmitting by a transceiver of the network entity the set of reference symbols;

configure the channel estimation related parameters used by the network entity and estimating channel information for a channel between the network entity and the further entity; and configure the channel estimation related parameters used by the network entity and reporting an estimate of channel information;

identify the network entity as a potential far off interferer; and configure the network entity to transmit a set of reference symbols associated with far off interferers.

17. An apparatus comprising a processor and at least one memory, the processor and the memory configured to:

configure channel estimation related parameters of a network entity of a communication system based on a current configuration of the communication system;

wherein the channel estimation related parameters are parameters associated with the estimation of channel information of a channel between the network entity and a further network entity wherein configure channel estimation related parameters of a network entity of a communication system comprises at least one of:

configure a set of reference symbols and transmitting by a transceiver of the network entity the set of reference symbols;

configure the channel estimation related parameters used by the network entity and estimating channel information for a channel between the network entity and the further entity; and configure the channel estimation related parameters used by the network entity and reporting an estimate of channel information;

identify a subset of the channel estimates to be used for the calculation of interference rejection capable receive filters where channel estimates comprising estimated channel information are generated for each of a plurality of channels.

* * * * *